(12) United States Patent
Kim et al.

(10) Patent No.: US 7,433,706 B2
(45) Date of Patent: Oct. 7, 2008

(54) MULTIBAND TRANSMITTING AND RECEIVING APPARATUS AND METHOD USING A CONTROL VOLTAGE OF PHASE LOCKED LOOP

(75) Inventors: Hoon-tae Kim, Yongin (KR); Gea-ok Cho, Yongin (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 409 days.

(21) Appl. No.: 10/656,152

(22) Filed: Sep. 8, 2003

(65) Prior Publication Data

US 2004/0048591 A1 Mar. 11, 2004

(30) Foreign Application Priority Data

Sep. 6, 2002 (KR) .................. 10-2002-0053823

(51) Int. Cl.
*H04M 1/00* (2006.01)
(52) U.S. Cl. .............. 455/552.1; 455/156.1; 455/260; 455/553.1
(58) Field of Classification Search .......... 455/260, 455/333, 156, 552.1, 552, 553, 180.4
See application file for complete search history.

(56) References Cited

U.S. PATENT DOCUMENTS

| | | | |
|---|---|---|---|
| 4,541,119 A * | 9/1985 | Cooper et al. ............... 455/526 |
| 5,821,820 A * | 10/1998 | Snider et al. .................. 331/48 |
| 5,929,708 A * | 7/1999 | Davis et al. ................. 330/288 |
| 5,929,716 A * | 7/1999 | Komori et al. .............. 331/135 |
| 6,014,571 A | 1/2000 | Enoki | |
| 6,215,988 B1 * | 4/2001 | Matero .................... 455/188.1 |
| 6,351,502 B1 | 2/2002 | Zagari | |
| 6,567,488 B1 * | 5/2003 | Cowley ...................... 375/362 |
| 6,708,044 B1 * | 3/2004 | Puknat et al. ............ 455/552.1 |
| 6,766,178 B1 * | 7/2004 | Damgaard et al. ....... 455/552.1 |
| 6,993,314 B2 * | 1/2006 | Lim et al. .................... 455/333 |
| 2003/0114129 A1 * | 6/2003 | Jerng ......................... 455/323 |
| 2005/0014476 A1 * | 1/2005 | Oono et al. ................. 455/118 |

FOREIGN PATENT DOCUMENTS

| | | |
|---|---|---|
| EP | 1 006 669 A1 | 6/2000 |
| EP | 1 113 573 A1 | 7/2001 |
| WO | WO 01/17121 A1 | 3/2001 |

OTHER PUBLICATIONS

Baars, Nico, "ICs and Discrete Semiconductors for TV and VCR Tuners", Electronic Components and Applications, Philips, Eindhoven, NL, vol. 9, No. 4, pp. 240-252, (1989).

* cited by examiner

*Primary Examiner*—Nay A. Maung
*Assistant Examiner*—Richard Chan
(74) *Attorney, Agent, or Firm*—Lee & Morse, P.C.

(57) ABSTRACT

A multiband RF transmitting and receiving apparatus and a method therefore is capable of using a control voltage from a phase locked loop (PLL) to control other components, as well as a voltage controlled oscillator (VCO), of a multiband RF transceiver. The multiband transmitting and receiving apparatus adjusts a capacitance value of a varactor in a power amplifier (PA) and a low noise amplifier (LNA) including an LC parallel resonance circuit, respectively, using the control voltage from the PLL and controls a current flowing to a mixer. Accordingly, the components in the multiband RF transceiver are able to operate a greater number of frequency bands than a single frequency band, thereby reducing the number of components required to design the multiband RF transceiver.

16 Claims, 8 Drawing Sheets

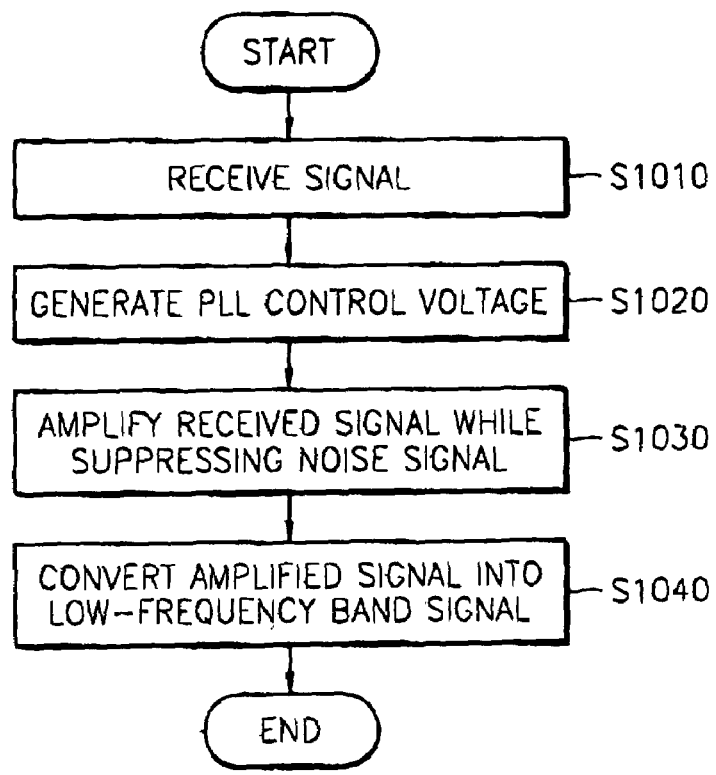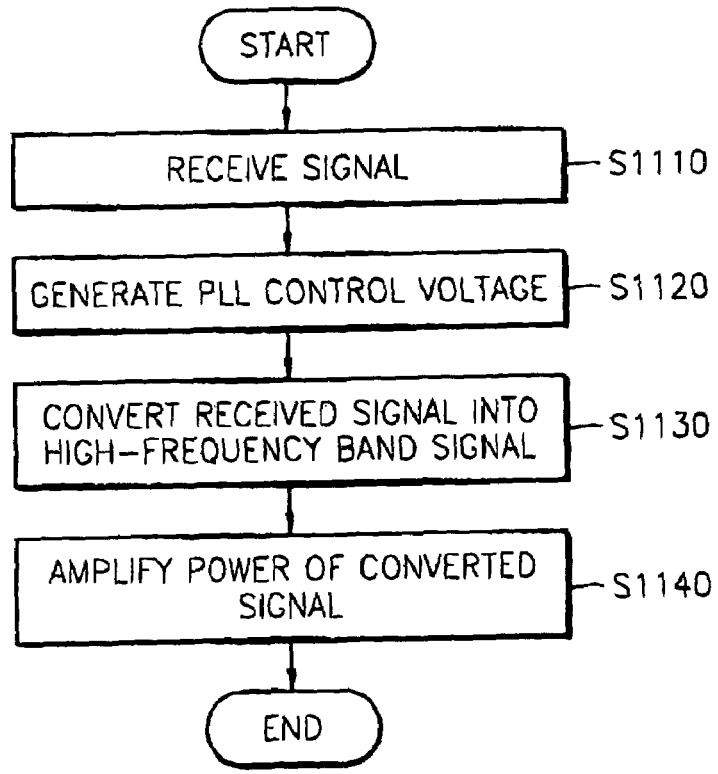

MULTIBAND TRANSMITTING AND RECEIVING APPARATUS AND METHOD USING A CONTROL VOLTAGE OF PHASE LOCKED LOOP

BACKGROUND OF THE INVENTION

1. Field of the Invention

The present invention relates to a multiband transmitting and receiving apparatus and method. More particularly, the present invention relates to a multiband radio frequency (RF) transmitting and receiving apparatus and a method that are capable of using a control voltage from a phase locked loop (PLL) to control other components as well as to control a voltage controlled oscillator (VCO) of a multiband RF transceiver.

2. Description of the Related Art

Recently, since various wireless communication services coexist, cellular phones capable of operating at dual-band or at tri-band have been actively researched. Unlike single-band cellular phones, which operate at only one frequency band, dual-band cellular phones can operate at two frequency bands (for example, 900 MHz and 1800 MHz), and tri-band cellular phones can operate at three frequency bands.

Efforts have already been made to combine various wireless communication devices. Producers of such wireless communication devices are required to manufacture products capable of operating at various frequency bands in order to satisfy the demands of users wanting additional functions. In addition, to reduce size and manufacturing cost, components used in such wireless communication devices need to operate at a number of different frequency bands. Therefore, there is now a demand for technology that can be used to combine IMT-2000, W-PAN (Wide band—Private Area Network), W-LAN (Wide band—Local Area Network), and the like, and for a single chip set capable of providing various services using only essential components.

Conventional techniques are either not capable of operating at multiple bands or not capable of operating at different frequency bands using a switch. Further, conventional techniques are complicated and can only be performed using highly complex structures.

SUMMARY OF THE INVENTION

The present invention provides a multiband RF transmitting and receiving apparatus and a method that are capable of using a control voltage created by a phase locked loop (PLL) to control various components and a voltage controlled oscillator (VCO) for use in a multiband RF transceiver.

More specifically, the control voltage output from the PLL can be applied to a low noise amplifier (LNA), a mixer, and a power amplifier (PA) as well as to the VCO, which allows these components to operate at more than one frequency band. Therefore, it is possible to reduce the number of required components in the multiband RF transceiver.

According to an embodiment of the present invention, there is provided a multiband receiving apparatus including a phase locked loop for receiving a reference frequency signal and a signal output from a voltage controlled oscillator and for generating a control voltage for controlling the frequency of the signal output from the voltage controlled oscillator, a low noise amplifier for receiving the control voltage, for operating at a frequency band that is adjusted by the control voltage, and for amplifying a received signal while suppressing a noise signal in the received signal, and a down mixer, including a plurality of transistors, for receiving the control voltage, for controlling an input voltage applied to the gate of a transistor acting as a source among the transistors, for operating at a frequency band that is adjusted by the control voltage, and for converting the amplified signal into a low-frequency band signal.

Preferably, the low noise amplifier includes an LC resonance circuit having an inductor and a capacitor, wherein a capacitance of the capacitor is adjusted by the control voltage provided by the phase locked loop to change a resonance frequency of the LC resonance circuit. Also preferably, the low noise amplifier has a cascade structure capable of minimizing a noise property and includes an inductive source degenerator for performing impedance matching. The down mixer may be a Gilbert-type structure.

Preferably, the down mixer includes a plurality of transistors, and wherein at least one of the plurality of transistors operates as a current source and at least one of the plurality of transistors operates as a load, and the down mixer controls an amount of current flowing from the transistor operating as the source to the transistor operating as the load using the control voltage from the phase locked loop, thereby adjusting an operating frequency band of the multiband receiving apparatus.

According to another embodiment of the present invention, there is provided a multiband transmitting apparatus including a phase locked loop for receiving a reference frequency signal and a signal output from a voltage controlled oscillator and for generating a control voltage for controlling the frequency of the signal output from the voltage controlled oscillator, an up mixer, including a plurality of transistors, for receiving the control voltage, for controlling an input voltage applied to a gate of one of the plurality of transistors that operates as a source, for operating at a frequency band, and for converting a transmitting signal into a high-frequency band of signal, and a power amplifier for receiving the control voltage, for operating with a gain that is adjusted by the control voltage, and for amplifying the converted signal by the adjusted gain.

The up mixer may be a Gilbert-type structure.

Preferably, the up mixer includes a plurality of transistors, and wherein at least one of the plurality of transistors operates as a current source and at least one of the plurality of transistors operates as a load, and the up mixer controls an amount of current flowing from the transistor operating as the source to the transistor operating as the load using the control voltage from the phase locked loop to adjust an operating frequency band.

Preferably, the power amplifier has a cascade structure including a plurality of terminals and includes an LC resonance circuit having an inductor and a capacitor, wherein a capacitance of the capacitor is adjusted using the control voltage provided by the phase locked loop to change a resonance frequency of the LC resonance circuit, to adjust a gain of the power amplifier.

According to still another embodiment of the present invention, there is provided a multiband transmitting and receiving apparatus including a phase locked loop for receiving a reference frequency signal and a signal output from a voltage controlled oscillator and for generating a control voltage for controlling a frequency of the signal output from the voltage controlled oscillator, a low noise amplifier for receiving the control voltage, for operating at a frequency band that is adjusted by the control voltage, and for amplifying a received signal without amplifying a noise signal in the receiving signal, a down mixer, including a plurality of transistors, for receiving the control voltage, for controlling an input voltage applied to the gate of one of the plurality of transistors acting as a source, for operating at a frequency band that is adjusted by the control voltage, and for converting the amplified signal into a low-frequency band signal, an up mixer, including a plurality of transistors, for receiving the control voltage, for controlling an input voltage applied to the gate of one of the plurality of transistors acting as a source, for operating at a frequency band that is adjusted by the control voltage, and for converting a transmitting signal into a high-frequency band signal, and a power amplifier, which receives the control voltage, for operating with a gain that is adjusted by the control voltage and for amplifying the converted signal by the adjusted gain.

According to a further embodiment of the present invention, there is provided a data receiving method, which is implemented on multiple frequency bands, including: (a) receiving a signal, (b) receiving a reference frequency signal and a signal output from a voltage controlled oscillator and controlling a control voltage that controls a frequency of the signal output from the voltage controlled oscillator, (c) receiving the control voltage, adjusting an operating frequency band, operating at the adjusted frequency band, and amplifying a received signal while suppressing a noise signal in the received signal, and (d) receiving the control voltage, controlling an input voltage applied to a gate of a transistor operating as a source using the control voltage to adjust an operating frequency band, operating at the adjusted frequency band, and converting the amplified signal into a low-frequency band signal.

According to still a further embodiment of the present invention, there is provided a data transmitting method, which is implemented on multiple frequency bands, including (a) receiving a signal, (b) receiving a reference frequency signal and a signal output from a voltage controlled oscillator and generates a control voltage that controls a frequency of the signal output from the voltage controlled oscillator, (c) receiving the control voltage, controlling an input voltage applied to a gate of a transistor operating as a source using the control voltage to adjust an operating frequency band, operating at the adjusted frequency band, and converting the received signal into a high-frequency band signal, and (d) receiving the control voltage to adjust the gain and amplifying the converted signal by the adjusted gain.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIG. 10 is a flow chart illustrating a multiband data receiving method, according to an embodiment of the present invention; and FIG. 11 is a flow chart illustrating a multiband data transmitting method, according to an embodiment of the present invention.

DETAILED DESCRIPTION OF THE INVENTION

Figure 1A:
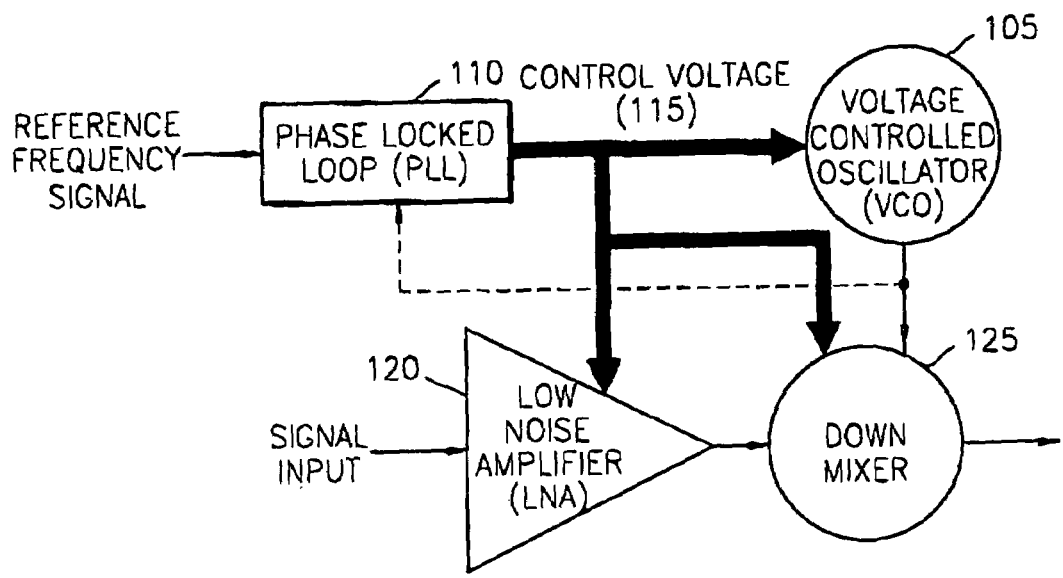
FIG. 1A is a block diagram showing a structure of a receiver that uses an output signal from a phase locked loop (PLL) to control respective components thereof, in a multiband transmitting and receiving apparatus that operates according to an embodiment of the present invention.

Korean Patent Application No. 2002-53823, filed on Sep. 6, 2002, and entitled: "Multiband Transmitting and Receiving Apparatus and Method Using a Control Voltage of a Phase Locked Loop," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

FIG. 1A is a block diagram showing a structure of a receiver having components that receive a signal output from a phase locked loop (PLL).

This receiver is used in a multiband transmitting and receiving apparatus according to an embodiment of the present invention.

Referring to FIG. 1A, a control voltage 115 from the PLL 110 is provided to various components of the receiver. The control voltage 115 is used to control an oscillation frequency of a voltage controlled oscillator (VCO) 105. The various components include a low noise amplifier (LNA) 120 and a down mixer 125. Additional components may include a voltage controllable capacitor, i.e., a varactor, (not shown) having a capacitance that varies with an applied input voltage and an inductor (not shown) having an inductance that varies with an applied input voltage.

Figure 1B:
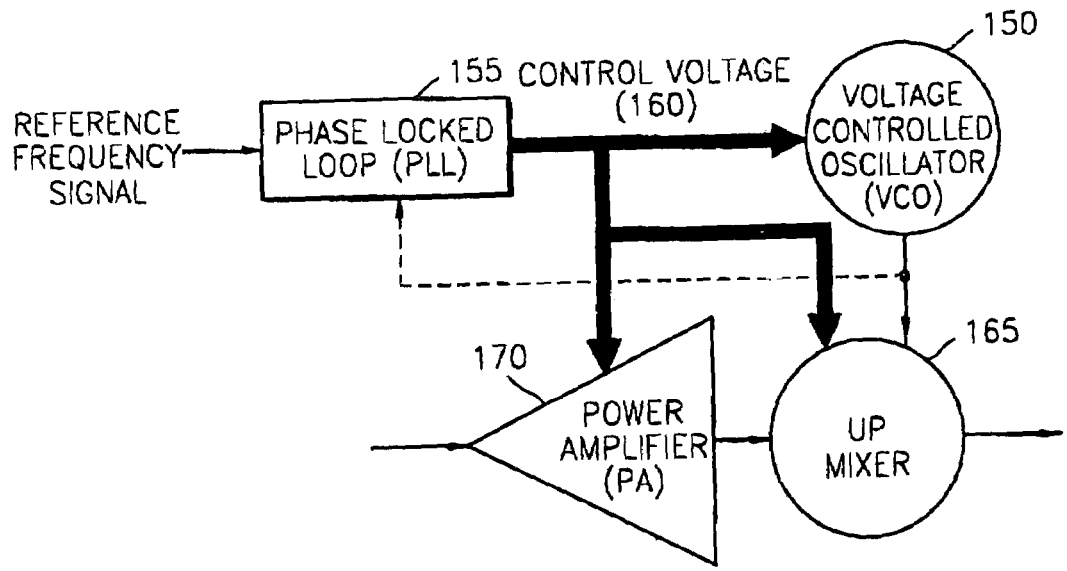
FIG. 1B is a block diagram showing a structure of a transmitter that uses an output signal from a PLL to control respective components thereof, in a multiband transmitting and receiving apparatus that operates according to an embodiment of the present invention.

FIG. 1B is a block diagram showing a structure of a transmitter that uses an output signal from a PLL to control respective components thereof in the multiband transmitting and receiving apparatus that operates according to an embodiment of the present invention.

Referring to FIG. 1B, a control voltage 160 from a PLL 155 is provided to various components of the transmitter. The control voltage 160 is used to control an oscillation frequency of a voltage controlled oscillator (VCO) 150. The various components include an up mixer 165 and a power amplifier (PA) 170. Additional components may include a varactor (not shown) having a capacitance that varies with an applied input voltage and an inductor (not shown) having an inductance that varies with an applied input voltage. Each of the components described above are controlled according to the control voltage 160 signal from the PLL 155.

The VCO 150 and PLL 155 as shown in FIG. 1B function the same as the VCO 105 and PLL 110 as shown in FIG. 1A.

More specifically, by installing a varactor that changes a capacitance value thereof according to the input voltage and an inductor that changes an inductance value thereof according to the input voltage, the LNA 120, down mixer 125, up mixer 165, and PA 170, etc., are each controlled by the control voltage (115 of FIG. 1A and 160 of FIG. 1B) received from the PLL (110 of FIG. 1A and 155 of FIG. 1B).

Figure 2:
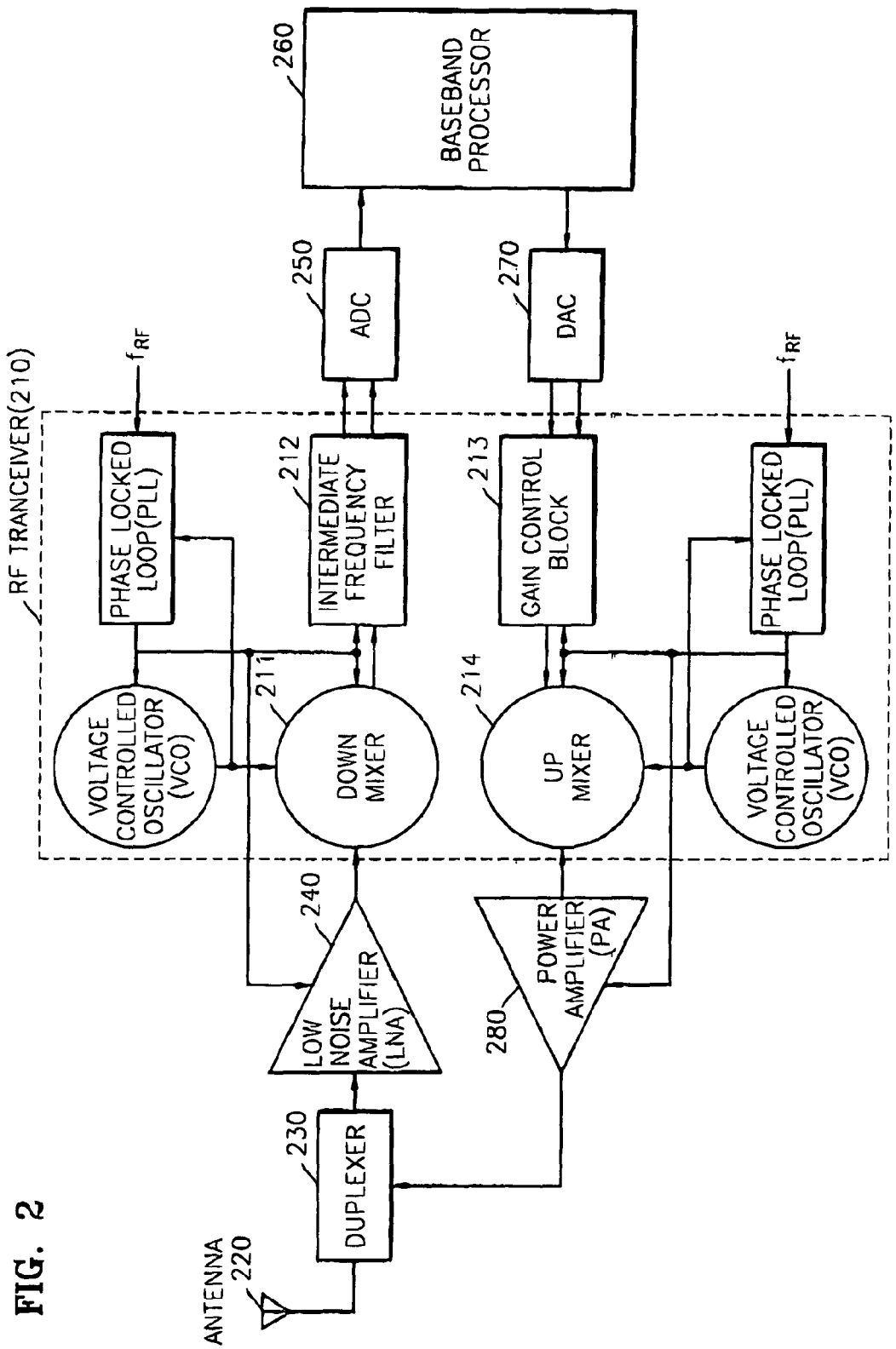
FIG. 2 is a block diagram showing a structure of an RF transmitting and receiving apparatus that uses an output signal of a PLL to control respective components thereof that operates according to an embodiment of the present invention.

FIG. 2 is a block diagram showing a structure of a RF transmitting and receiving apparatus that uses the output signal from the PLL to control various components thereof that operates according to the present invention.

The area surrounded by dotted lines represents an RF transceiver 210, which is realized on a single chip. Referring to FIG. 2, an operation of the receiver of the RF transmitting and receiving apparatus is described in detail as follows. An RF signal received through an antenna 220 is transferred to a low noise amplifier (LNA) 240 via a duplexer 230 acting as a switch. The LNA 240 amplifies the signal and transfers it to a down mixer 211.

The down mixer 211 converts the received RF signal into a low-frequency band signal. This low-frequency is called an intermediate frequency $f_{IF}$. To perform the frequency conversion, a frequency $f_{Lo}$ produced by a local oscillator (LO) is needed. As shown in FIG. 2, a PLL receives a reference frequency signal $f_{RF}$ and a signal output from a VCO and outputs a constant frequency signal to the VCO. The down mixer 211 receives the amplified RF signal from the LNA 240 and a signal output from the VCO and performs frequency conversion of the RF signal to output the low-frequency band signal. This low-frequency band signal is expressed by Equation 1 below.

$$f_{IF} = f_{RF} - f_{LO} \quad (1)$$

The frequency-converted signal from the down mixer 211 is sequentially passed through an intermediate frequency filter 212 and an analog-to-digital converter (ADC) 250, to be converted into a digital signal, and then transferred to a baseband processor 260.

The operation of the transmitter of the RF transmitting and receiving apparatus will now be described in detail with reference to FIG. 2. A baseband signal from the baseband processor 260 is passed through a digital-to-analog converter (DAC) 270 where it is converted into an analog signal and then output to a gain control block 213. The gain control block 213 controls the gain of the analog signal according to an amplified level. The gain control block 213, which is a filter, filters various noise components of frequencies generated during loop operation and changes the control voltage of a VCO by changing an accumulated charge quantity of a capacitor. A power amplifier (PA) 280 is only able to amplify a constant gain.

Figure 3:
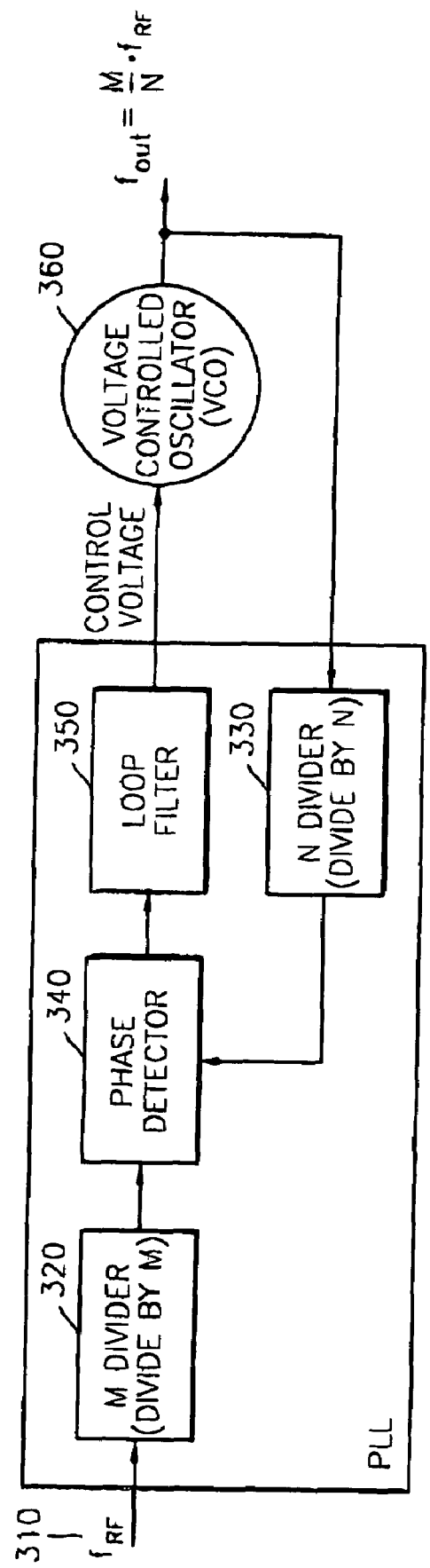
FIG. 3 is a block diagram showing a structure of the PLL used in an embodiment of the present invention.

FIG. 3 is a block diagram showing a structure of a frequency synthesizer used in an embodiment of the present invention.

Referring to FIG. 3, a frequency synthesizer includes the PLL and a voltage controlled oscillator (VCO) 360, and varies an output frequency of the VCO 360 using the reference frequency $f_{RF}$ 310. FIG. 3 is a detailed diagram of the relationship between the PLL and the VCO in FIG. 2. Reference frequency $f_{RF}$, which is generated by a resonance of a crystal, is inputted to the PLL.

The inputted reference frequency $f_{RF}$ 310 is divided by M divider 320 and the divided reference frequency $f_{RF}$ is transferred to a phase detector 340. Output signal $f_{out}$ which is divided by N divider 330 is additionally inputted to the phase detector 340. The phase detector 340 detects phases of two divided signals and generates a voltage signal proportional to the phase difference. Loop filter 350 filters noise components in the output signal of the phase detector 340, and compensates a feedback loop of the PLL. The loop filter 350 includes a low pass filter (LPF) and filters out various noise components generated in the feedback loop. The LPF includes capacitors and a control voltage of the VCO 360 is varied by the variation of an amount of charges stored in the capacitor.

Accordingly, the VCO outputs a frequency signal $f_{out}$ proportional to an inputted reference voltage $f_{RF}$ 310. In addition, because phase is obtained by integrating frequency with respect to time, the output phase of the VCO 360 is controlled by adjusting the input control voltage. As a result, the VCO 360 outputs the frequency $f_{out}$ represented by Equation 2 below.

$$f_{out} = \frac{M}{N} \cdot f_{RF} \quad (2)$$

Figure 4:
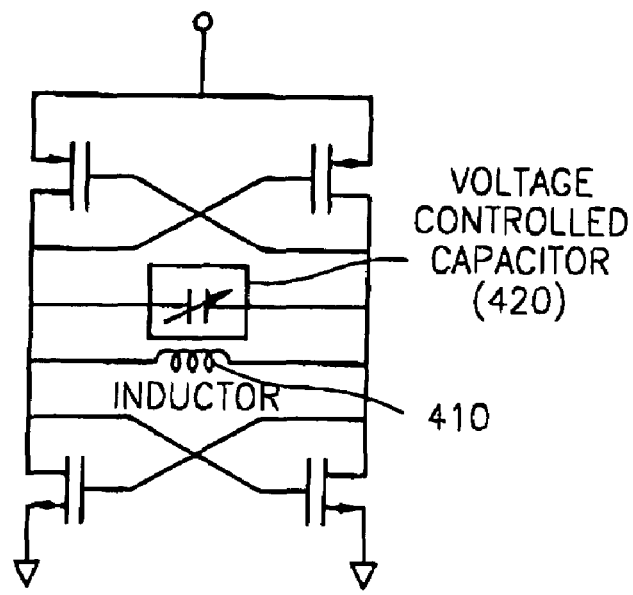
FIG. 4 is a circuit diagram of a voltage controlled oscillator (VCO) used in an embodiment of the present invention.

FIG. 4 is a circuit diagram of the VCO used in the present invention.

The oscillation frequency of the VCO 360 is determined by a resonance frequency of an inductor 410 and a capacitor 420 that are connected in parallel. Accordingly, to change an oscillation frequency of the VCO, a varactor (voltage controllable capacitor) is used as the capacitor 420. Since the capacitance value C of the varactor 420 is changed according to an input voltage, an LC parallel resonance frequency $f_o$, which is calculated using Equation 3 below, is also changed according to the capacitance value C.

$$f_o = \frac{1}{2\pi\sqrt{LC}} \quad (3)$$

Therefore, since the control voltage created by the PLL of FIG. 3 is input to the varactor 420 of the VCO shown in FIG. 4, the control voltage also changes the oscillation frequency of the VCO.

Figure 5:
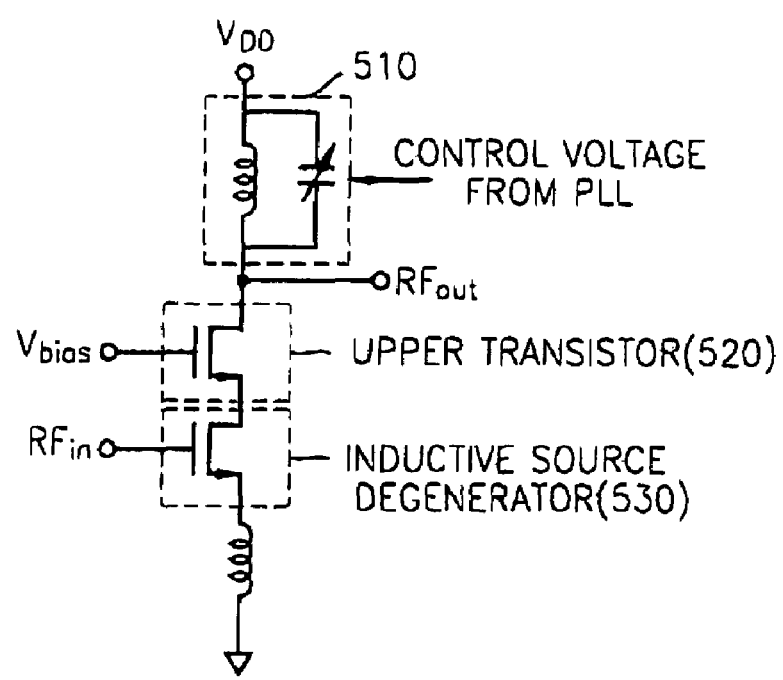
FIG. 5 shows a structure of a low noise amplifier (LNA) used in an embodiment of the present invention.

FIG. 5 shows a structure of an LNA used in an embodiment of the present invention.

Referring to FIG. 5, the LNA has a cascade structure capable of minimizing noise and uses an inductive source degenerator 530 for impedance matching. Such an LNA shown in FIG. 5 is widely used at a frequency band of about 2-5 GHz.

Here, to increase gain, an LC parallel resonance circuit 510 instead of an inductive load is connected to the drain of an upper transistor 520. A varactor having a capacitance that can be changed is used instead of a capacitor having a fixed capacitance value. Accordingly, the gain can be maximized, considering that the impedance of this resonance circuit is maximum at a specific frequency. Therefore, according to an embodiment of the present invention, by using a voltage controllable capacitor, that is, a varactor, in the resonance circuit of the LNA, and adjusting the capacitance value of the varactor using the control voltage created by the PLL, the LNA can change the resonance frequency of the LC parallel resonance circuit according to the input frequency band.

More specifically, the LNA does not provide maximum amplification at only one frequency band of the input signal, but operates at frequency bands by changing the values of components in the resonance circuit according to the frequency range of the input signal. Here, there are two types of varactors, a MOS varactor and a junction varactor, wherein the MOS varactor has a capacitance value of about 1-6 pF.

In addition, to allow the resonance circuit to operate over a wider frequency range, two or more varactors can be interconnected in parallel in the resonance circuit, which also allows the resonance frequency to be changed within a wider frequency band.

Figure 6:
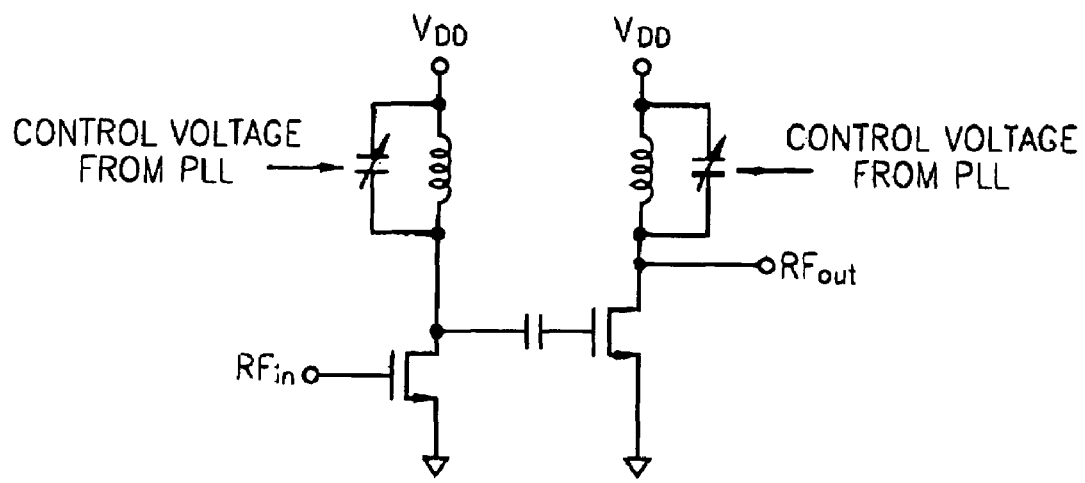
FIG. 6 shows a structure of a power amplifier (PA) used in an embodiment of the present invention.

FIG. 6 shows a structure of a power amplifier (PA) used in an embodiment of the present invention.

The PA has a cascade structure including two or three terminals according to the desired output powers. A PA having a two-terminal cascade structure uses an LC parallel resonance circuit including a varactor to increase gain, as in the LNA. More particularly, like the LNA of FIG. 5, the varactor having a capacitance value that can be changed is also used in the LC parallel resonance circuit of the PA to adjust the gain according to the control voltage created by the PLL.

Figure 7:
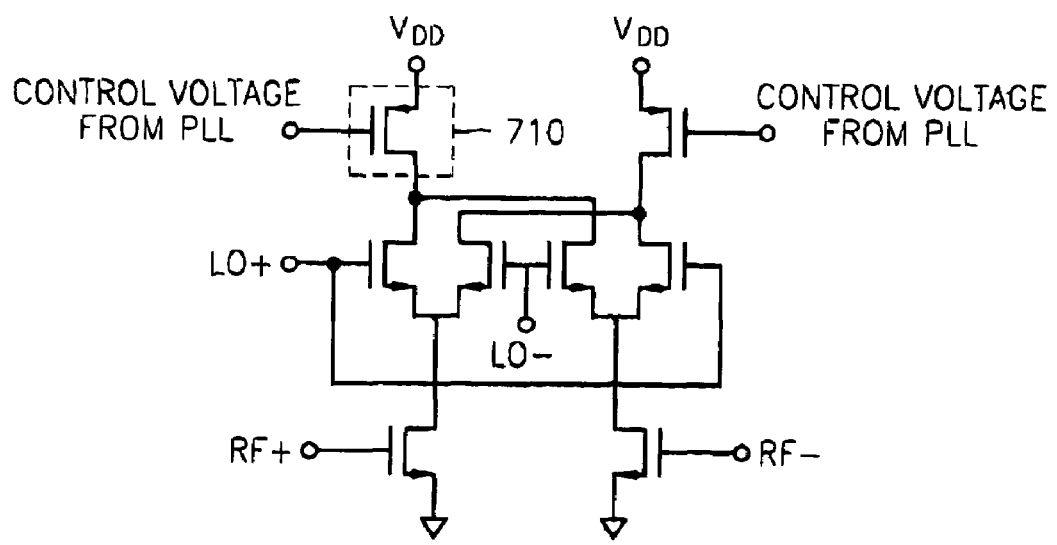
FIG. 7 shows a structure of a mixer used in an embodiment of the present invention.

FIG. 7 shows the structure of a mixer used in an embodiment of the present invention.

The mixer of FIG. 7 is a general Gilbert-type mixer. This type of mixer can use an LC parallel resonance circuit as a load. In addition, the components used in the LNA and PA as described above can be used in the mixer. That is, a varactor instead of a capacitor may be used in the LC parallel resonance circuit of the mixer, and the control voltage of the PLL may be used as the voltage for controlling the varactor. In FIG. 7, a transistor 710 operates as a current source and an active device realized as a different transistor is used as a load. Conventionally, resistors are generally used as the load. However, because such a resistor has a fixed value, the resonance circuit including the resistor as the load will operate only at one frequency band. As seen in FIG. 7, an amount of current passing through the transistor 710 can be controlled using the control voltage (generated by the PLL) applied to the gate of the transistor 710.

Figure 8:
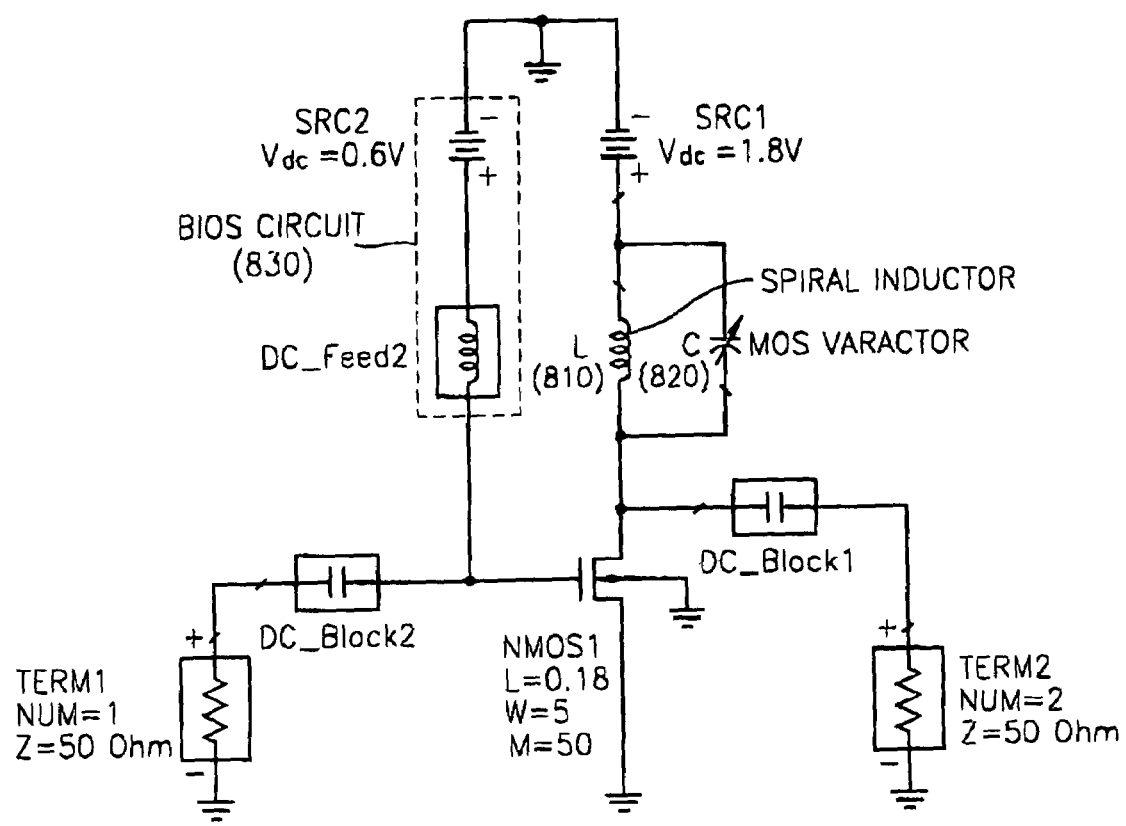
FIG. 8 is a circuit diagram showing an embodiment of the LNA used in the present invention.

FIG. 8 is a circuit diagram showing an embodiment of the LNA used in the present invention.

FIG. 8 is a detailed circuit diagram of the LNA structure of FIG. 5, except for the upper transistor 520. In FIG. 8, L 810 is a spiral inductor (Dim=300 μm, Width=10.0 μm, Space=2.0 μm, and turns=2.5), C 820 is a MOS varactor (Width=5.0 μm, Length=0.4 μm, and Finger=20×8), and the area 830 surrounded by dotted-lines represents a bias circuit.

Figure 9:
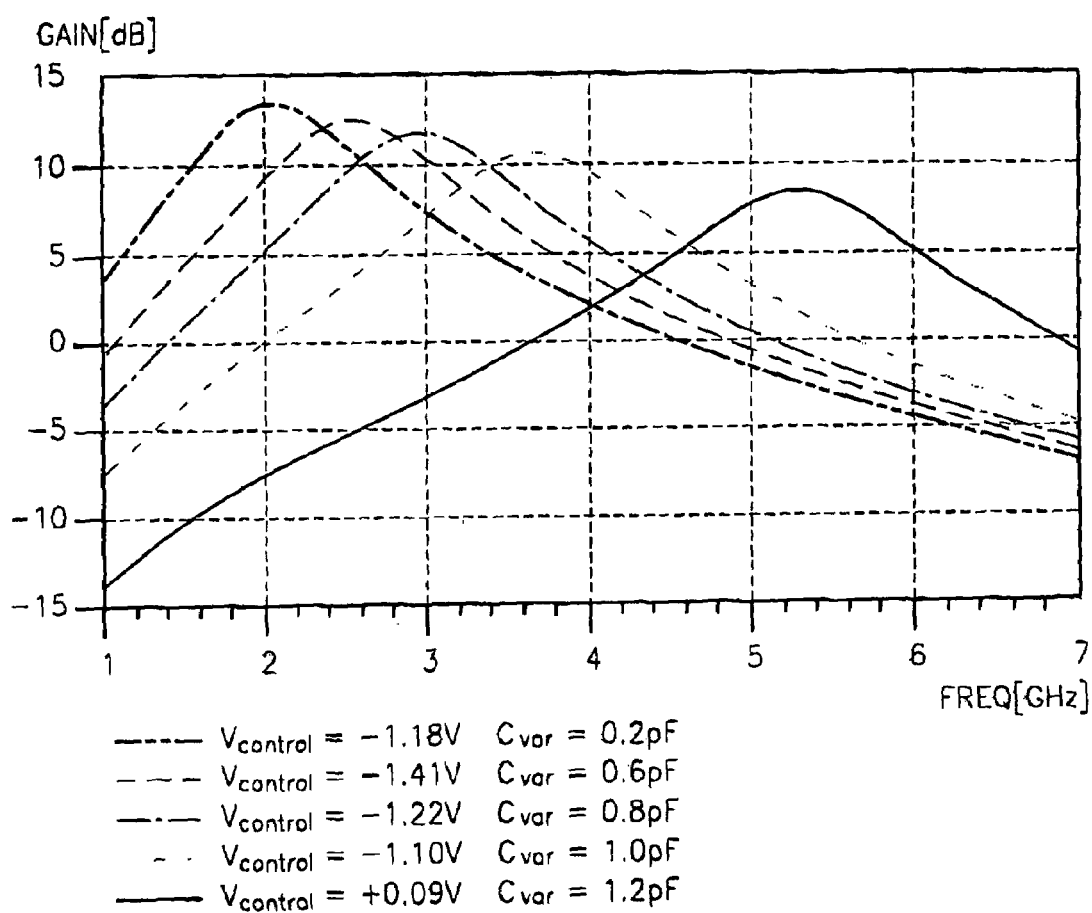
FIG. 9 is a graph showing a simulation result of the LNA of FIG. 8.

FIG. 9 shows the results of a simulation performed on the LNA of FIG. 8.

FIG. 9 shows several gain versus frequency curves for different $V_{control}$ and $C_{var}$ values, wherein $V_{control}$ represents the control voltage output from the PLL and $C_{var}$ is the capacitance of the varactor. As may be seen in FIG. 9, the capacitance of the varactor $C_{var}$ changes according to the control voltage value applied by the PLL and accordingly the frequency characteristic also changes.

FIG. 10 is a flow chart illustrating a method of receiving data of multiple frequency bands according to an embodiment of the present invention.

Referring to FIG. 10, first, in step S1010, a signal is received. The PLL receives a reference frequency signal and an output signal from the VCO, and, in step S1020, generates a control voltage for controlling an output signal from the VCO.

Then, in step S1030, the LNA receives the control voltage that adjusts the operating frequency band of the LNA. The LNA operates at the adjusted frequency band and amplifies the received signal without amplifying, i.e., suppressing, a noise signal in the receiving signal. The LNA includes the LC resonance circuit including the inductor and the capacitor. More specifically, the capacitance of the capacitor in the LNA is adjusted according to the control voltage and thus the resonance frequency of the LC resonance circuit changes. This causes the operating frequency band to change.

Then, in step S1040, the down mixer receives the control voltage and controls an input voltage applied to the gate of the transistor operating as a source using the control voltage, to thereby adjust an operating frequency band thereof. Next, the down mixer operates at the adjusted frequency band and converts the amplified signal into a low-frequency band signal. The down mixer includes a plurality of transistors. The down mixer operates at least one of the plurality of transistors as a current source and at least one of the plurality of transistors as a load. Accordingly, using the control voltage, the down mixer controls an amount of current flowing from the transistor acting as the source to the transistor acting as the load, thereby adjusting an operating frequency band thereof.

FIG. 11 is a flow chart illustrating a multiband data transmitting method, according to an embodiment of the present invention.

Referring to FIG. 11, first, in step S1110, a signal is received. The PLL receives a reference frequency signal and an output signal from the VCO, and, in step S1120, generates a PLL control signal for controlling the frequency of an output signal from the VCO.

Then, in step S1130, the up mixer receives the control voltage and controls the input voltage applied to the gate of the transistor using the control voltage, thereby adjusting an operating frequency band thereof. The up mixer operates at the adjusted frequency band and converts the received signal into a high-frequency band of signal. The up mixer includes a plurality of transistors. The up mixer operates at least one of the plurality of transistors as a current source and at least one of the plurality of transistors as a load. Accordingly, using the control signal, the up mixer controls an amount of current flowing from the transistor acting as the source to the transistor acting as the load, thereby adjusting an operating frequency band thereof.

Then, in step S1140, the power amplifier receives the control voltage to adjust the gain and amplifies the converted signal by the adjusted gain. The power amplifier has a cascade structure including a plurality of terminals and includes the LC resonance circuit including the inductor and the capacitor. The power amplifier adjusts the capacitance of the capacitor and thus changes the resonance frequency of the LC resonance circuit to thereby adjust the gain.

As described above, according to the present invention, it is possible to reduce the number of required components upon designing a multiband transmitting and receiving apparatus, and thus reduce the complexity of the circuit, by using a control voltage created by a PLL and provided to different components for controlling their operating frequency bands.

In addition, it is possible to easily change the operating frequency of each component within a multiband transmitting and receiving apparatus by installing a voltage controllable capacitor as a load in the component.

Exemplary embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A multiband receiving apparatus, comprising:
a voltage controlled oscillator including a varactor;
a phase locked loop for receiving a reference frequency signal and a signal output from the voltage controlled oscillator and for generating a control voltage, input to the varactor, for controlling the frequency of the signal output from the voltage controlled oscillator;
a low noise amplifier for receiving the control voltage, for operating at a frequency band that is adjusted by the control voltage, and for amplifying a received signal while suppressing a noise signal in the received signal; and
a down mixer, including a plurality of transistors, for receiving the control voltage, for controlling an input voltage applied to the gate of a transistor acting as a source among the transistors, for operating at a frequency band that is adjusted by the control voltage, and for converting the amplified signal into a low-frequency band signal.

2. The multiband receiving apparatus as claimed in claim 1, wherein the low noise amplifier comprises:
an LC resonance circuit having an inductor and a capacitor, wherein a capacitance of the capacitor is adjusted by the control voltage provided by the phase locked loop to change a resonance frequency of the LC resonance circuit.

3. The multiband receiving apparatus as claimed in claim 1, wherein the low noise amplifier has a cascade structure capable of minimizing a noise property and comprises:
an inductive source degenerator for performing impedance matching.

4. The multiband receiving apparatus as claimed in claim 1, wherein the down mixer has a Gilbert-type structure.

5. The multiband receiving apparatus as claimed in claim 1, wherein the down mixer comprises a plurality of transistors, and wherein at least one of the plurality of transistors operates as a current source and at least one of the plurality of transistors operates as a load, and the down mixer controls an amount of current flowing from the transistor operating as the source to the transistor operating as the load using the control voltage from the phase locked loop, thereby adjusting an operating frequency band of the multiband receiving apparatus.

6. A multiband transmitting apparatus, comprising:
a voltage controlled oscillator including a varactor;
a phase locked loop for receiving a reference frequency signal and a signal output from the voltage controlled oscillator and for generating a control voltage, input to the varactor, for controlling the frequency of the signal output from the voltage controlled oscillator;
an up mixer, including a plurality of transistors, for receiving the control voltage, for controlling an input voltage applied to a gate of one of the plurality of transistors that operates as a source, for operating at a frequency band, and for converting a transmitting signal into a high-frequency band of signal; and
a power amplifier for receiving the control voltage, for operating with a gain that is adjusted by the control voltage, and for amplifying the converted signal by the adjusted gain.

7. The multiband transmitting apparatus as claimed in claim 6, wherein the up mixer has a Gilbert-type structure.

8. The multiband transmitting apparatus as claimed in claim 6, wherein the up mixer comprises a plurality of transistors, and wherein at least one of the plurality of transistors operates as a current source and at least one of the plurality of transistors operates as a load, and the up mixer controls an amount of current flowing from the transistor operating as the source to the transistor operating as the load using the control voltage from the phase locked loop to adjust an operating frequency band.

9. The multiband transmitting apparatus as claimed in claim 6, wherein the power amplifier has a cascade structure including a plurality of terminals and comprises:
an LC resonance circuit having an inductor and a capacitor, wherein a capacitance of the capacitor is adjusted using the control voltage provided by the phase locked loop to change a resonance frequency of the LC resonance circuit, to adjust a gain of the power amplifier.

10. A multiband transmitting and receiving apparatus, comprising:
a voltage controlled oscillator including a varactor;
a phase locked loop for receiving a reference frequency signal and a signal output from the voltage controlled oscillator and for generating a control voltage, input to the varactor, for controlling a frequency of the signal output from the voltage controlled oscillator;
a low noise amplifier for receiving the control voltage, for operating at a frequency band that is adjusted by the control voltage, and for amplifying a received signal without amplifying a noise signal in the receiving signal;
a down mixer, including a plurality of transistors, for receiving the control voltage, for controlling an input voltage applied to the gate of one of the plurality of transistors acting as a source, for operating at a frequency band that is adjusted by the control voltage, and for converting the amplified signal into a low-frequency band signal;
an up mixer, including a plurality of transistors, for receiving the control voltage, for controlling an input voltage applied to the gate of one of the plurality of transistors acting as a source, for operating at a frequency band that is adjusted by the control voltage, and for converting a transmitting signal into a high-frequency band signal; and
a power amplifier, which receives the control voltage, for operating with a gain that is adjusted by the control voltage and for amplifying the converted signal by the adjusted gain.

11. A data receiving method, which is implemented on multiple frequency bands, comprising:
(a) receiving a signal;
(b) receiving a reference frequency signal and a signal output from a voltage controlled oscillator including a varactor and controlling a control voltage, input to the varactor, that controls a frequency of the signal output from the voltage controlled oscillator;
(c) receiving the control voltage, adjusting an operating frequency band, operating at the adjusted frequency band, and amplifying a received signal while suppressing a noise signal in the received signal; and
(d) receiving the control voltage, controlling an input voltage applied to a gate of a transistor operating as a source using the control voltage to adjust an operating frequency band, operating at the adjusted frequency band, and converting the amplified signal into a low-frequency band signal.

12. The data receiving method as claimed in claim 11, wherein in a low noise amplifier including an LC resonance circuit including an inductor and a capacitor, (c) comprises:
adjusting a capacitance value of the capacitor using the control voltage; and changing a resonance frequency of the LC resonance circuit to adjust the operating frequency band of the low noise amplifier.

13. The data receiving method as claimed in claim 11, wherein in a down mixer including a plurality of transistors, wherein at least one of the plurality of transistors operates as a current source and at least one of the plurality of transistors operates as a load, (d) comprises:

controlling an amount of current flowing from the transistor operating as the source to the transistor operating as the load, using the control voltage, to adjust an operating frequency band of the down mixer.

14. A data transmitting method, which is implemented on multiple frequency bands, comprising:

(a) receiving a signal;

(b) receiving a reference frequency signal and a signal output from a voltage controlled oscillator including a varactor and generates a control voltage, input to the varactor, that controls a frequency of the signal output from the voltage controlled oscillator;

(c) receiving the control voltage, controlling an input voltage applied to a gate of a transistor operating as a source using the control voltage to adjust an operating frequency band, operating at the adjusted frequency band, and converting the received signal into a high-frequency band signal; and (d) receiving the control voltage to adjust the gain and amplifying the converted signal by the adjusted gain.

15. The data transmitting method as claimed in claim 14, wherein in an up mixer including a plurality of transistors, wherein at least one of the plurality of transistors operates as a current source and at least one of the plurality of transistors operates as a load, (c) comprises:

controlling an amount of current flowing from the transistor operating as the source to the transistor operating as the load, using the control voltage, to adjust an operating frequency band.

16. The data transmitting method as claimed in claim 14, wherein in a power amplifier having a cascade structure including a plurality of terminals, and including an LC resonance circuit having an inductor and a capacitor, (d) comprises:

controlling a capacitance of the capacitor using the control voltage and changing a resonance frequency of the LC resonance circuit to control a gain of the power amplifier.

* * * * *